Nov. 9, 1937.   J. R. MORGAN   2,098,510
WHEEL AND CHAIN GUARD FOR BICYCLES
Filed May 23, 1936   2 Sheets-Sheet 2
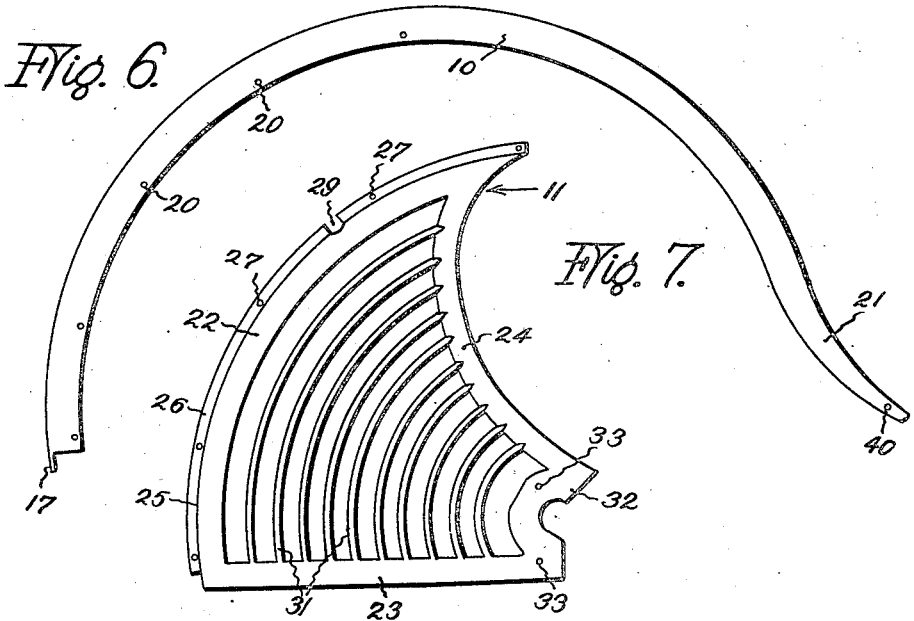
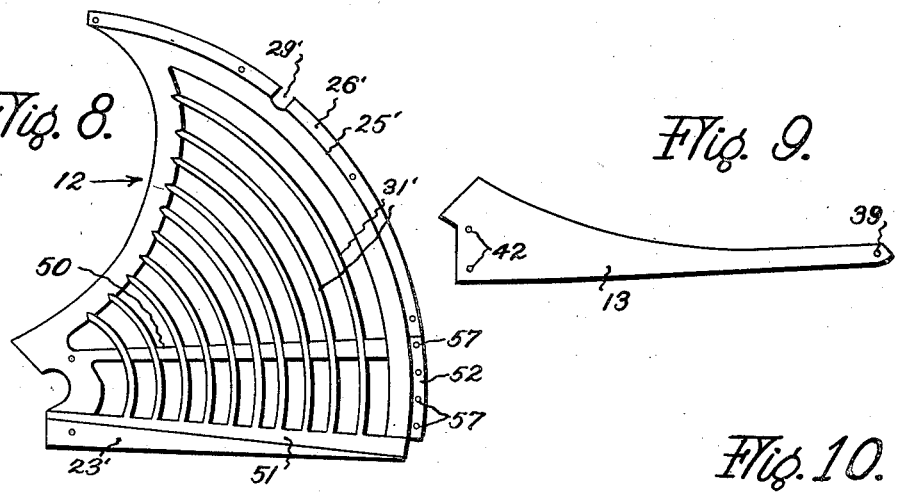
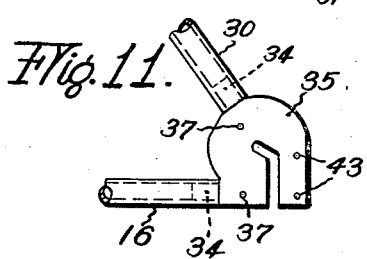
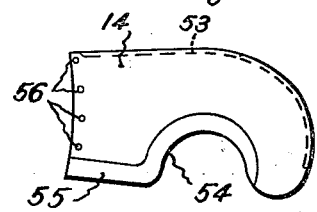
INVENTOR
JOHN R. MORGAN
BY
Chapin & Neal
ATTORNEYS Patented Nov. 9, 1937

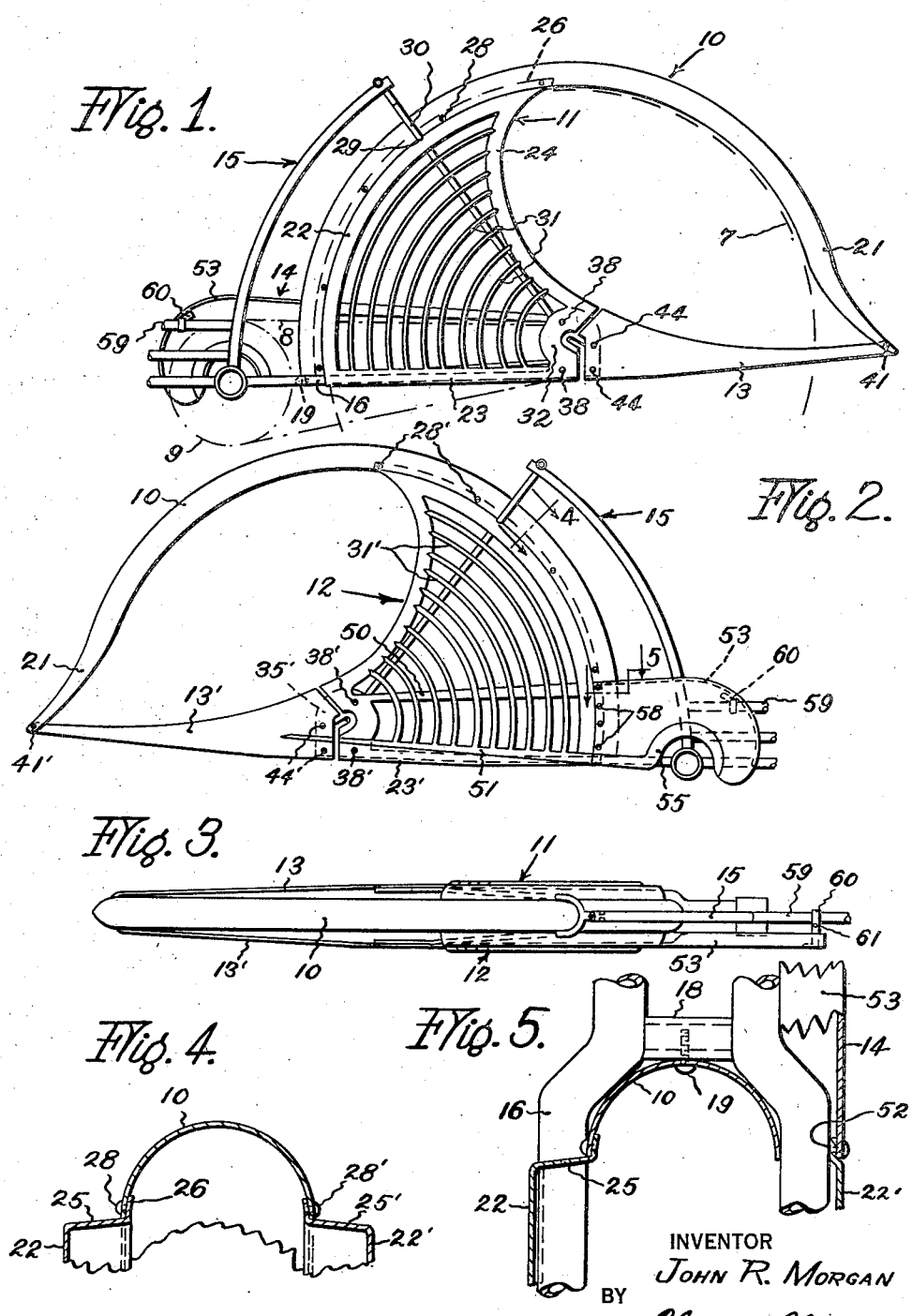

2,098,510

UNITED STATES PATENT OFFICE 2,098,510

WHEEL AND CHAIN GUARD FOR BICYCLES

John R. Morgan, Oak Park, Ill., assignor to Sears, Roebuck and Co., Chicago, Ill., a corporation of New York Application May 23, 1936, Serial No. 81,392

3 Claims. (Cl. 280—152.2)

This invention relates to chain and wheel guards for bicycles and more particularly to a construction for completely guarding the rear wheel of bicycles as is desirable in bicycles intended for women's use.

One object is to provide a more complete guard for the wheel, chain, and sprockets than has been afforded in the past. Another object is to provide a guard of this complete character which may be connected in a firm and rigid manner to the frame of the bicycle without objectionably increasing the weight of the vehicle. Another object is to so construct the guarding members that the guarding structure may be economically manufactured and may be easily and rapidly assembled.

Other and further objects residing in the details of construction will be made apparent from the following specification and claims.

In the accompanying drawings, which illustrate one embodiment of the invention—

Fig. 1 is a side view of the guard, together with the portions of a bicycle frame to which it is attached, viewed from the side opposite the chain and sprocket;

Fig. 2 is a similar view looking at the chain and sprocket side of the bicycle;

Fig. 3 is a top plan view of the structure as shown in Fig. 2;

Fig. 4 is a sectional view substantially on line 4—4 of Fig. 2;

Fig. 5 is a sectional view substantially on line 5—5 of Fig. 2;

Fig. 6 is a side detail view of the mudguard element;

Fig. 7 is a similar view of the skirt guard element for the non-driving side of the bicycle frame;

Fig. 8 is a similar view of the skirt guard element for the driving side of the frame;

Fig. 9 is a similar view of one of the tail elements of the guard;

Fig. 10 is a similar view of the sprocket guard element; and

Fig. 11 is a similar view of one of the rear fork plates which forms one of the attaching elements of the assembly.

Referring to the drawings, the guard is shown as comprising a mudguard element 10, a skirt guard element 11 for the non-driving side of the frame, a skirt guard element 12 for the driving side of the frame, that is the side on which the sprockets and chain are placed, two tail pieces 13 by which the skirt guards are secured to the mudguard, and a sprocket guard element 14. All of these members are stamped from sheet metal.

A portion of the bicycle frame is generally indicated at 15, only those portions being shown which function in the support of the guard.

The mudguard 10 is arcuate in cross-section over most of its length, as best shown in Figs. 4 and 5, and for the major portion of its length extends peripherally around the rear wheel indicated at 7 in Fig. 1. As shown in the latter figure, it is positioned between the rear horizontal fork members 16, as is usual. The forward end is formed with a lug 17 by which that end is bolted or otherwise secured to cross member 18 of the frame, as indicated at 19, Fig. 5. The depending flange portion of the guard 10 is provided with a plurality of bolt or rivet holes 20 for attachment of the skirt elements as later described. The rear end of the guard 11 is extended, as at 21, and curved downwardly to approximately the level of the horizontal fork members 16.

The skirt guard elements 11 and 12 are similar in construction, the latter being modified to accommodate and guard the major portion of the chain, indicated at 8 in Fig. 1. The member 11 is shown as a generally triangular open frame, the side 22 being curved to conform to the curvature of the mudguard element 10 and the side 23 is straight to follow the horizontal fork members 16 of the frame. The side 24 is shown as curved, but might be straight or take any other suitable shape. The side 22, as best shown in Figs. 4 and 5, is bent inwardly along its outer edge, forming a shoulder portion 25. Portion 25 is provided with an upstanding flange 26 having holes 27 positioned to correspond with holes 20 in the element 10 for the reception of bolts or rivets 28 which secure the elements 10 and 11 rigidly together. The flange 26 and the adjacent portion 25 are apertured at 29 to receive the inclined fork member 30 of the bicycle frame, see Figs. 1 and 7, so that the skirt guards are located outwardly of the members 30. As shown, members 24 and 23 of the guard 11 are connected by arcuate ribs 31, formed integrally with members 23 and 24 and preferably curved in cross-section to give rigidity to the guard. The ribs 31 may take any other suitable form so long as they are arranged to prevent the garments of the rider from coming in contact with the bicycle wheel and are shaped to render the guard rigid. As will be obvious, the ribs 31 may be given various pleasing shapes to enhance the appearance of the guard without sacrificing the structural functions mentioned.

The sides 23 and 24 terminate at their rear ends in a flat arcuate plate portion 32, provided with bolt or rivet holes 33 and forming a point of attachment to the bicycle frame at the juncture of the horizontal and inclined fork members 16 and 30.

As best shown in Fig. 11, the ends of the fork members 16 and 30, which are formed of tubing, telescope over and are welded or otherwise permanently secured to lugs 34 formed integral with a vertical plate 35 which thus forms part of the bicycle frame. The plate 35 is provided with an angular slot 36 to receive the rear wheel mounting which may be of conventional form. Holes 37 are formed in plate 35 to correspond with holes 33 by means of which the guard member 11 is rigidly secured to the plate 35 by bolts or rivets 38, see Fig. 1.

The rear end of mudguard 10 is connected by tail piece 13 to plate 35 and through said plate to the skirt guard member 11 which in turn, as previously described, is rigidly secured by rivets 28 to the forward portion of the mudguard. The rear end of tail piece 13 is provided with a hole 39 to coincide with a hole 40 in the mudguard 11 for the accommodation of a connecting bolt or rivet 41, Fig. 1. The forward end of the tail piece is provided with rivet holes 42 corresponding with similar holes 43 in plate 35 for the accommodation of bolts or rivets 44. Plate 35 is made large enough so that guards 11 and 12 and tail pieces 13 may be connected thereto over a substantial area so that there is no tendency of the members to pivot around their connections. Plates 35 form the guarding structure into an integral unit, and since plate 35 is itself an integral part of the bicycle frame an exceedingly sturdy structure results.

This completes the guard on the non-driving side of the bicycle and it will be seen that a completely rigid unitary guard structure is provided by the combination of parts described and the manner of their attachment to each other and the bicycle frame.

The guard on the driving side of the frame is similar. The only substantial difference being the modification of the skirt element 12 to accommodate the driving chain and the addition of sprocket guard 14. Except for these modifications which will now be described, it will be understood that element 12 is exactly similar to member 11, just described, except that the parts are reversed in position, and where reference is made to similar parts the same, but primed, reference characters are used.

Referring to Figs. 2 and 8, the arcuate ribs 31' are integrally connected by a generally horizontal rib 50 positioned over the upper run of the sprocket chain 8. The lower member 23' is provided with an outwardly struck rib 51 positioned along the lower edge portion of the guard. The shoulder portion 25' and flange 26' are cut away at the lower portion of the guard and replaced by a short offset flange 52, see Figs. 5 and 8. Flange 52 forms a means for the attachment of sprocket guard 14 which, as shown in Figs. 1, 5, and 10, is provided along its upper and forward edge with an inturned flange 53 to guard the upper run of the chain as it passes around the sprocket, indicated at 9 in Fig. 1. The lower side of member 14 is recessed at 54 to accommodate the pedal crank, not shown, and the lower edge is formed with a struck-out reenforcing rib 55. The rear edge of member 14 is provided with rivet holes 56, corresponding to rivet holes 57 formed in flange 52 of skirt guard member 12, for the reception of rivets 58, see Fig. 2. The forward end of member 14 is secured to a bar 59 of frame 15 by a rigid strap bracket 60 welded to member 14 and clamped around bar 59 by a bolt or rivet 61, see Figs. 1 and 3.

The skirt guard member 12 is secured to the mudguard 10 and to a plate 35' by rivets 28' and 38' respectively and the rear end of guard 10 is connected to plate 35' by a tail piece 13' riveted at 41' to the mudguard and to the plate 35' at 44'.

As previously stated, the various elements of the guard structure may be economically stamped out of sheet metal. It will further be seen that due to the rigid interconnection of the parts to each other and to the frame that, as previously stated, an exceedingly sturdy guard structure results which is less subject to damage from careless treatment of the vehicles than the guards now commonly in use. Furthermore, the distribution of the strains by the complete, rigid, non-rotatable interconnection of the various parts very materially minimizes the tendency of the guard structure to develop rattles due to the loosening of the connections.

I claim:—

1. In combination, a bicycle frame, an arcuate mudguard positioned between the rear fork members and extending around the upper portion of the rear wheel, and skirt guard members, each formed of a single piece of sheet metal, positioned on opposite sides of the rear wheel outwardly of the inclined members of the rear fork, slots formed in the upper forward edges of the skirt guards in which slots the inclined members of the rear fork engage, the forward and upper edges of the skirt guards being rigidly secured to the adjacent edges of the mudguard over substantially the entire length of said forward and upper edges, the skirt guards extending downwardly at least to the level of the horizontal members of the rear fork.

2. In combination a bicycle frame, an arcuate mudguard extending around the upper half of the rear wheel with its ends positioned substantially at the level of the horizontal members of the rear fork of the frame, skirt guard members, each formed of a single piece of sheet metal, positioned on opposite sides of the rear wheel, said skirt guards being rigidly secured to the forward and upper portions of the mudguard and enclosing the inclined members of the rear fork, the lower edges of the skirt guards extending at least to the horizontal members of the rear fork, a sprocket guard for the front sprocket of the bicycle, said sprocket guard being secured at its rear edge to the front edge of the adjacent skirt guard and at its front portion to the frame, tail pieces secured to the rear end of the mudguard, and vertical plates integrally secured to the rear ends of the rear fork members, said skirt guards and tail pieces being rigidly and non-rotatably secured to said plates.

3. In combination, a bicycle frame having the rear ends of the rear fork members at each side integrally connected to vertical plate members, an arcuate mudguard having its forward end secured to the horizontal portion of the rear fork and extending around the upper portion of the rear wheel in substantially concentric relation thereto, the rear end portion of the mudguard being extended downwardly to the level of the horizontal members of the rear fork, generally triangular skirt guards positioned on opposite sides of the rear wheel, each of said skirt guards being integrally formed of sheet metal and having an arcuate edge portion rigidly secured over substantially its entire length to the adjacent edge of the forward portion of the mudguard, the skirt guards being positioned outwardly of the rear fork members and extending to the horizontal fork member of the frame, the rear end portions of the skirt guards being rigidly secured to the adjacent vertical plate member of the rear fork, tail pieces rigidly connecting the rear end of the mudguard to the vertical plates, and a flanged sprocket guard connected at its forward end portion to the frame of the bicycle and having its rear edge secured to the forward edge of the adjacent skirt guard.

JOHN R. MORGAN.